(12) United States Patent
Abercrombie et al.

(10) Patent No.: US 8,304,670 B2
(45) Date of Patent: Nov. 6, 2012

(54) PORTABLE WEIGHING SYSTEM WITH ALIGNMENT FEATURES

(75) Inventors: Robert Knox Abercrombie, Knoxville, TN (US); Gregory David Richardson, Knoxville, TN (US); Matthew Bligh Scudiere, Oak Ridge, TN (US); Frederick T. Sheldon, Knoxville, TN (US)

(73) Assignee: Ut-Battelle, LLC, Oak Ridge, TN (US)

( * ) Notice: Subject to any disclaimer, the term of this patent is extended or adjusted under 35 U.S.C. 154(b) by 348 days.

(21) Appl. No.: 12/732,599

(22) Filed: Mar. 26, 2010

(65) Prior Publication Data
US 2011/0232974 A1    Sep. 29, 2011

(51) Int. Cl.
G01G 21/28    (2006.01)
G01G 19/02    (2006.01)

(52) U.S. Cl. ......... 177/126; 177/132; 177/133; 177/238
(58) Field of Classification Search ................. 177/126, 177/132–134, 238, 262
See application file for complete search history.

(56) References Cited

U.S. PATENT DOCUMENTS

| | | | | |
|---|---|---|---|---|
| 3,999,621 A * | 12/1976 | Wagner | ............ | 177/1 |
| 4,813,504 A * | 3/1989 | Kroll | ............ | 177/21 |
| 4,979,581 A * | 12/1990 | Kroll | ............ | 177/211 |
| 5,446,248 A * | 8/1995 | Strasser | ............ | 177/134 |
| 5,959,259 A | 9/1999 | Beshears et al. | | |
| 5,998,741 A | 12/1999 | Beshears et al. | | |
| 6,459,050 B1 | 10/2002 | Muhs et al. | | |
| 6,706,976 B1 * | 3/2004 | Schuler | ............ | 177/126 |
| 7,094,976 B2 * | 8/2006 | Kim | ............ | 177/132 |
| 7,214,893 B2 * | 5/2007 | Sikula | ............ | 177/238 |
| 7,305,324 B2 | 12/2007 | Beshears et al. | | |
| 7,375,293 B2 * | 5/2008 | Beshears et al. | ............ | 177/25.13 |
| 7,423,225 B1 | 9/2008 | Kroll et al. | | |
| 2008/0095404 A1 | 4/2008 | Abercrombie et al. | | |
| 2009/0125273 A1 | 5/2009 | Hively et al. | | |
| 2011/0220424 A1 * | 9/2011 | Sagarsee et al. | ............ | 177/128 |
| 2011/0232973 A1 * | 9/2011 | Abercrombie et al. | ....... | 177/132 |

OTHER PUBLICATIONS http://www.ioc.ornl.gov/projects/wim.shtml, Weigh-In-Motion (WIM), Apr. 29, 2009, Cyberspace Sciences and Information Intelligence Research, (4 pages).

* cited by examiner

*Primary Examiner* — Randy W Gibson
(74) *Attorney, Agent, or Firm* — Luedeka Neely Group, P.C.

(57) ABSTRACT

A system for weighing a load is disclosed. The weighing system includes a pad having at least one transducer for weighing a load disposed on the pad. In some embodiments the pad has a plurality of foot members and the weighing system may include a plate that disposed underneath the pad for receiving the plurality of foot member and for aligning the foot members when the weighing system is installed. The weighing system may include a spacer disposed adjacent the pad and in some embodiments, a spacer anchor operatively secures the spacer to a support surface, such as a plate, a railway bed, or a roadway. In some embodiments the spacer anchor operatively secures both the spacer and the pad to a roadway.

3 Claims, 2 Drawing Sheets

US 8,304,670 B2

PORTABLE WEIGHING SYSTEM WITH ALIGNMENT FEATURES

GOVERNMENT RIGHTS

This invention was made with government support under Contract No. DE-AC05-00OR22725 awarded by the U.S. Department of Energy. The government has certain rights in the invention.

CROSS REFERENCES TO RELATED APPLICATIONS

This patent application is related to U.S. Pat. No. 5,959,259, titled "System and Method for Accurately Weighing and Characterizing Moving Vehicles", issued Sep. 28, 1999; U.S. Pat. No. 5,998,741, titled "System and Methods for Accurately Weighing and Characterizing Moving Vehicles", issued Dec. 7, 1999; U.S. Pat. No. 6,459,050, titled "Method and Apparatus for Converting Static In-ground Vehicle Scales Into Weigh-In-Motion Systems", issued Oct. 1, 2002; U.S. Pat. No. 7,305,324, titled "System and Method for Identifying, Validating Weighing and Characterizing Moving or Stationary Vehicles and Cargo", issued Dec. 4, 2007; U.S. Pat. No. 7,375,293, titled "System and Method for Weighing and Characterizing Moving or Stationary Vehicles and Cargo", issued May 20, 2008; and U.S. Pat. No. 7,423,225, titled "Weigh In Motion Technology", issued Sep. 9, 2008; all herein incorporated by reference in their entirety.

FIELD

This disclosure relates to the field of weigh-in-motion systems. More particularly, this disclosure relates to improvements to a weigh-in-motion system for removably anchoring the pad of a weighing system to a support surface.

BACKGROUND

Weigh-in-motion (WIM) systems may be used to estimate the overall weight of a moving vehicle (or a vehicle that is not moving). WIM systems typically employ a sensor pad system that is deployed in a roadway, and vehicles are weighed as they drive over the sensor pad system. Besides the overall weight, it is often desirable to measure such characteristics of a vehicle as the weight that individual tires impose on the roadway, the speed profile of the vehicle, the individual axle weights, the distance between axles, and the lateral and the longitudinal center of balance of the vehicle. Such information may be useful, for example, to load and balance an aircraft prior to take-off. Such characteristics are also useful to commercial vehicle law enforcement officers to quickly and accurately determine the individual axle weights for highway safety. Industry may use WIM systems to determine the tare weight on incoming (or outgoing) vehicles and to determine the load weight as the vehicle exits (or enters) a facility, thus quickly and accurately determining the weight of product delivered to (or taken from) the facility. Various automated features may be included in WIM systems to improve the accuracy of the weighing process by reducing personnel hours and the time required for deployment and by eliminating opportunities for human errors from the manual transfer of data or from the miscalculation of vehicle attributes.

Oftentimes it is desirable to move a WIM system between multiple locations. However portable WIM systems often encounter such problems as inaccurate positioning of WIM pads during installation, migration of pads as the system is used, deformation of the roadway surface as the system is used. For these and other reasons improvements are needed in portable WIM systems.

SUMMARY

The present disclosure provides a pad for use in a weighing system configured for weighing a load, including weighing a load while the load is moving along a travel path. The system includes a weighing platform having a bottom surface and a top surface configured for receiving the load to be weighed. A first load cell and a second load cell are typically arranged as a pair and are aligned laterally with respect to the travel path. Each load cell generally has a top surface and a bottom surface, and the load cell is usually attached to the weighing platform such that the top surface of each load cell is disposed adjacent the bottom surface of the weighing platform. The system generally also includes a first foot member and a second foot member each having a top surface and a bottom surface. The first foot member is attached to the first load cell such that the top surface of the first foot member is disposed adjacent the bottom surface of the first load cell, and the second foot member is attached to the second load cell such that the top surface of the second foot member is disposed adjacent the bottom surface of the second load cell. The bottom surfaces of each foot member is disposed adjacent a support surface, which may be a roadway or railway bed for example. In some embodiments the system has a plate disposed underneath the weighing platform and the foot members are disposed adjacent the plate and the plate is disposed adjacent the roadway. The plate, railway bed and the roadway are examples support surfaces. An anchor may be used to operatively secure the plate to the roadway.

In some embodiments, the weighing system includes a spacer disposed adjacent the weighing platform. An anchor may be attached to the spacer and a support surface (for example, a roadway or a plate) for operatively securing the spacer to the support surface.

In some embodiments the weighing system includes a plate and a spacer disposed adjacent the weighing platform, an anchor may operatively secure the spacer to the plate. The same anchor or a different anchor may also operatively secure both the spacer and the plate to the support surface.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred embodiments, reference is made to the accompanying drawings, which form a part hereof, and within which are shown by way of illustration the practice of specific embodiments of the improvement to weigh-in-motion technology. It is to be understood that other embodiments may be utilized, and that structural changes may be made and processes may vary in other embodiments.

A weighing system generally includes low profile pads laid out on the support surface along the direction of travel for a vehicle to be weighed. Each of these pads typically includes a plurality of load cells or sensors disposed along the edges of the pad, and in some applications, also disposed in center regions of the pads. From these arrangements the total weight of the vehicle's load as well as the center of mass of the load and other physical characteristics of the vehicle may be calculated.

Figure 1:
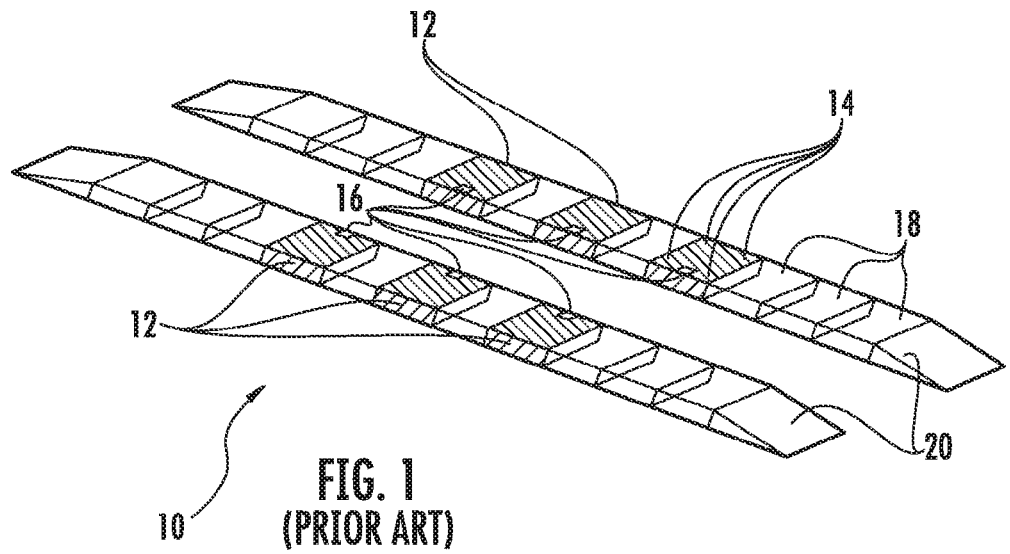
FIG. 1 is a somewhat schematic perspective view of a weighing system including several pads.

The weighing system 10 is shown in FIG. 1. The system 10 includes one or more sets of pads 12 (one or more pairs, with three pairs shown) each with individual transducers (also referred to as sensors or load cells) 14 located within the pads 12. If a vehicle moves over the pads 12 at a speed that does not exceed the response time of the load cells 14, the pads 12 measure the weight imposed on the pad by the tire(s) as it/they roll(s) over the pads 12. The system 10 is also capable of providing a static weight imposed by the tire(s) when the tire(s) is/are stationary on the pad 12. Furthermore, the system typically includes pad microcomputers 16 having a bus structure onboard each individual pad 12. The pad microcomputers 16 are configured for distributed intelligence and interchangeability of pads 12. The system 10 then may be used to determine tire weight, time of tire on pad center, and speed of tire over pad center. In some embodiments, the system 10 includes a daisy chain connection between each of the pads 12 to provide power and transmit accumulated data. In some applications, a host microcomputer collects data from the individual transducers, identifies the individual transducers, determines their relative positions, and determines the attributes of interest such as individual tire(s) weights, individual axle weights, axle spacing, speed profiles and longitudinal and transverse center of balance.

The system 10, in some embodiments, also includes spacers 18 that allow a vehicle to maintain a level orientation and a smoother passage as the vehicle moves over the transducers 14 for weighing. Attached to the outer-most spacers 18 are entrance and exit ramps 20 which provide a smooth transition from ground level to the transducer height for in-motion weighing. Truck suspensions have a typical suspension constant of about 10,000 lbs/inch. That corresponds to 1000 lbs for a rise of just a tenth of an inch. Typical truck suspensions have a resonant frequency of around 3 Hz. For in-motion weighing it is important not to exceed acceptable thresholds of bouncing as the vehicle rolls over the system 10. Doing so could produce significant errors irrespective of the accuracy of the weighing system 10. Accordingly, having long smooth ramps 20 at both the entrance and exit is helpful for accurate weighing in motion.

Figure 2:
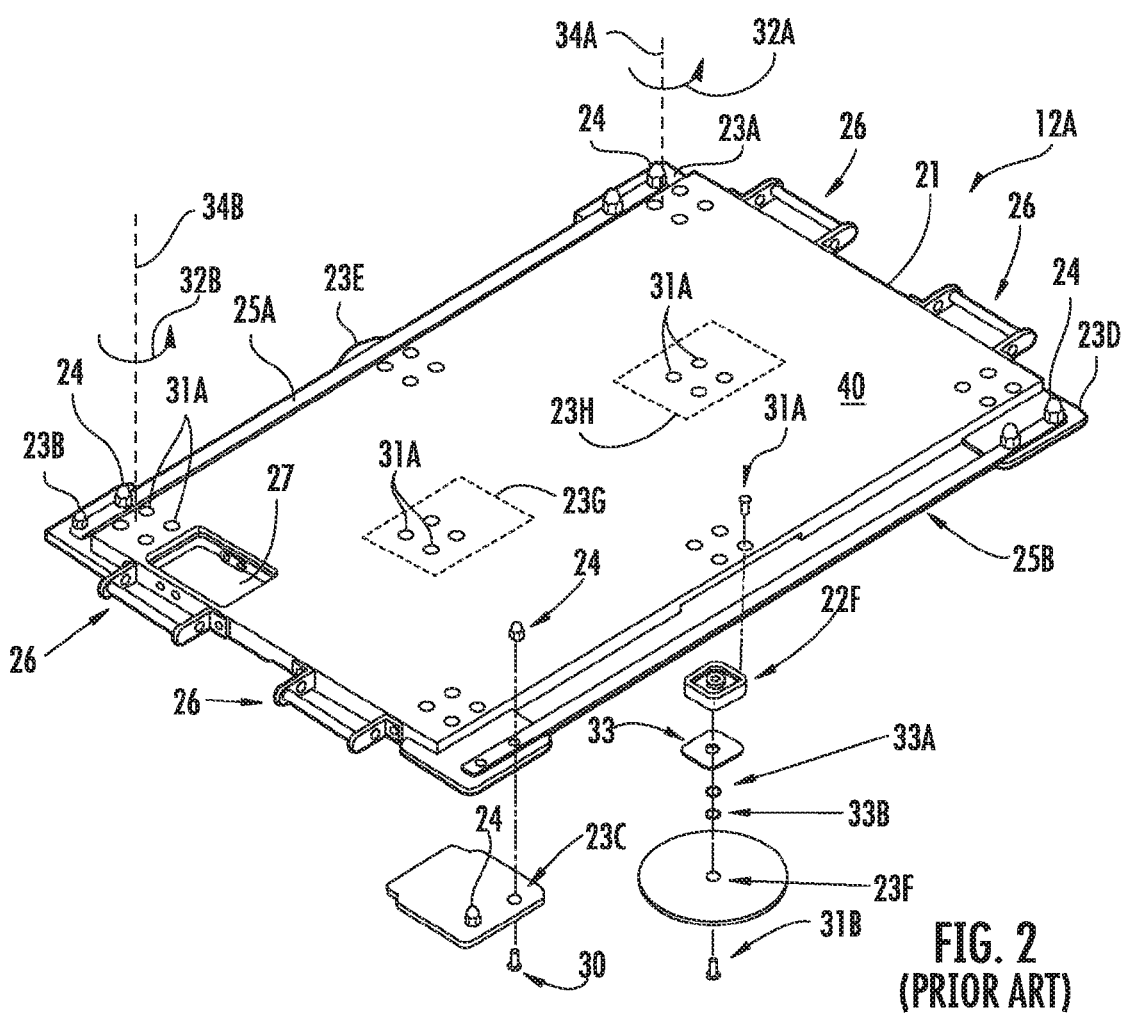
FIG. 2 is a somewhat schematic perspective view of portions of a an embodiment of a pad of a weighing system.

FIG. 2 depicts an embodiment of the pad 12 showing a rectangular platform 21 and eight foot members 23A, 23B, 23C, 23D, 23E, 23F, 23G, and 23H. Expanded views of the assembly of two foot members 23C and 23F are depicted. Also depicted is an exemplary load cell 22F. The pad 12 is useable in the weighing system 10 described above. The pad 12 is also useable as a stand-alone, low profile electronic weighing scale. The pad 12 generally includes a platform 21, at least one load cell 22 (exemplified by load cell 22F), and a plurality of foot members 23. The notation "nn" (e.g., "23") is used herein to describe a particular type of element (such as a "foot member"), and that "nn" notation is modified to "nnX" (e.g., "23A") to identify a specific instance of that element.

Foot pins 24, foot straps 25, handles 26, and an on-board control circuit 27 are also included in the embodiment of the pad 12 shown. Handles 26 facilitate transportation of the pads 12. Control circuit 27 typically includes a summing board, an analog to digital converter, a microprocessor, or a similar component or a combination of such components, and is communicatively connected to an interface and a Central Processing Unit (CPU) in some applications. While analog summing boards are often used to combine the outputs of multiple load cells, alternatively, load cell 22 output may be read individually, digitally converted and processed. In other words, the load cells 22 may be summed by either analog or digital means, either on board the pad 12 or externally, for example via a CPU.

The foot pins 24 are preferably arranged in longitudinally aligned pairs at the corners of the pad 12 and are connected to the foot members 23A-23F via screws 30, which also secure ends of flexible, elongated, and longitudinally oriented foot straps 25A and 25B. The flexible foot straps 25A and 25B assist in the alignment of the foot pads 23A-23D during deployment of the pad 12, but after deployment, by being flexible, any rotation (as indicated by exemplary arrows 32A and 32B) of one corner foot members (e.g., 23A or 23B) about its vertical axis (e.g., 34A and 34B) is not transferred to the other foot member connected by the flexible foot strap. This mitigation of cross-coupled rotation improves the accuracy of weighing measurements.

One embodiment of a pad 12 is a rectilinear, preferably rectangular, member constructed of a rigid material, preferably a metal such as stainless steel or aluminum. The Pad 12 is preferably relatively thin so that it has a low profile for ease of traversal by a vehicle, and for minimizing the weight of the pad 12. The pad 12 has a flat top surface 40 and a bottom surface. The bottom surface is substantially flat except for a plurality of load cell cavities (recesses) disposed at corner and side and central locations. Load cell screw holes, preferably four (4) each, are located at each recess to permit load cell top screws or fasteners 31B to connect from the top of the pad 21 to a load cell 22 (as exemplified by load cell 22F depicted in FIG. 2) that is disposed in each cavity. A plurality of rectangular (at corner and central locations) or circular (at center locations) foot cavities (recesses) are provided in the bottom of the pad 12. Each foot cavity is aligned with a load cell cavity. The dimensions of the foot cavities typically are larger than (and accept) the dimensions of the associated load cell cavities.

Each load cell 22 is placed on top of a foot member, shown as foot members 23A-23H in FIG. 2. Lower screw 31B passes through the foot member 23A-23H, through lower and upper washers 33B and 33A, through a gasket 33 (which aids in sealing the load cell 22 in its cavity) to the bottom of the load cell 22. Upper screws 31A connect the load cell 22 to the pad 21. Foot members 23A-23D are disposed at corner locations of the pad 12, while foot members 23E-23F are disposed laterally and foot members 23G and 23H are disposed centrally. The location of the corner foot members 23A-23D is such that they extend substantially horizontally outwardly beyond the pad 12. Side foot members 23E and 23F extend slightly outwardly beyond the pad 12. The foot members 23A-23H are operatively secured to the pad 12 by a combination of one or more of the screws 30, 31A, 31B and other elements as depicted in FIG. 2. As used herein, the term "operatively secured" refers to an arrangement of the recited elements that establishes a structural connection between the recited elements, either by direct attachment of the elements together or by connection of the recited elements through one or more intervening elements. Typically the dimensions of the load cell 22, the bottom screw 31B, and washers 33 elevate the bottom of the load cell 22 from the top of the foot members 23.

Figure 3:
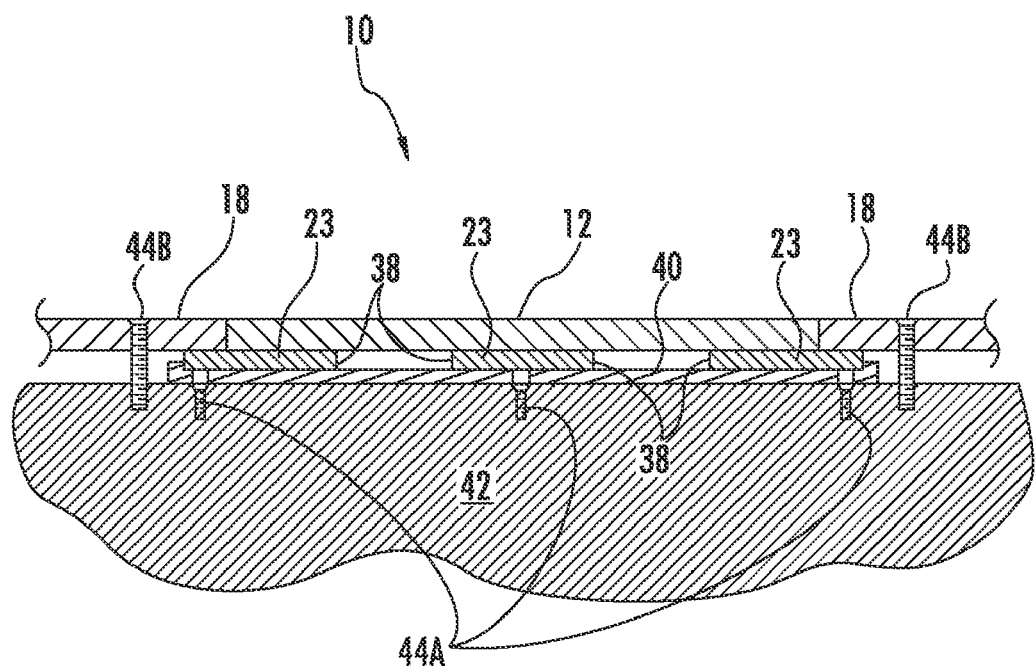
FIG. 3 is a somewhat schematic cross-sectional view of a weighing system installed on a support surface.

FIG. 3 presents a more detailed illustration of the pad 12 as part of a weighing system 10. The weighing system 10 includes two spacers 18 as discussed previously with reference to FIG. 1. Multiple foot members 23 are attached to the underside of the pad 12 and those foot members 23 extend out from the edge of the pad 12. Some of the foot members 23 contact the spacers 18. In some embodiments the foot members 23 that contact the spacers 18 are also attached to the spacers 18.

In the embodiment of FIG. 3 the foot members 23 are disposed in recesses 38 formed in a plate 40 that is disposed underneath the foot members 23. The recesses 38 are configured to mate with the foot members 23 and align the pad 12 in the correct orientation for use of the weighing system 10. Improper alignment of the foot members 23 has an adverse affect on the accuracy of a weighing system. The foot members 23 are examples of registration elements that provide a frame of reference for proper alignment of the pad 12. The recesses 38 are examples of registering elements that are operatively secured to a support surface (i.e., the plate 40) and that may be mated with the registration elements (i.e., the foot members 23) to align the pad 12 for use in the weighing system 10.

Typically the foot members 23 and the recesses 38 are operatively secured to each other by manual interlocking The term "manual interlocking" as used herein refers to a configuration that is capable of being assembled manually without the use of tools. For example, the foot members 23 and the recesses 38 may be configured to snap together by a pushing force that does not require a tool such as a hammer or a screwdriver. Manually interlocked components remain operatively secured to each other during normal use of a weighing system. A tool may be required to disassemble components that are manually interlocked.

As further illustrated in FIG. 3, the plate 40 is operatively secured to the support surface 42 by anchors 44A. Also in the embodiment of FIG. 3, spacer anchors 44B are used to operatively secure the spacers 18 to the roadway 42. Note that in the configuration of FIG. 3 the spacers 18 overlap one of the foot members 23, such that the spacer anchors 44B operatively secure the pad 12 to a support surface (i.e., the roadway 42 in this embodiment). In addition to facilitating the alignment of the weighing system 10, the plate 40 reinforces the roadway 42 to reduce subsidence from a concentration of vehicle traffic that may occur at a weighing system site over time.

Figure 4:
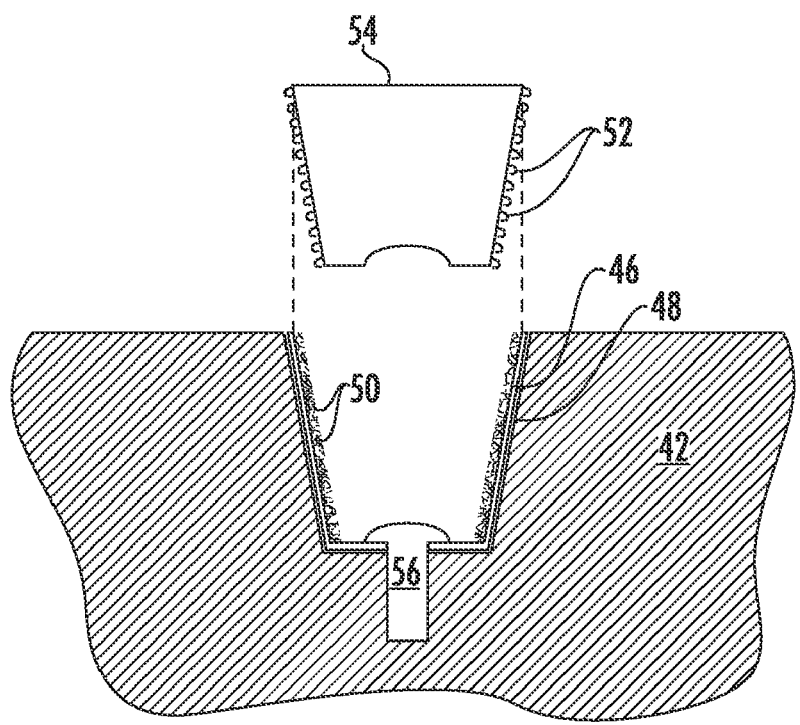
FIG. 4 is a somewhat schematic cross-sectional view of a plug and a receptacle that may be used to operatively secure a pad to a support surface.

FIG. 4 illustrates a receptacle 46 that is installed in a recess 48 of the support surface 42. The receptacle 46 has surface features 50 that mate with surface features 52 of a plug 54. A fastener 56 is used to operatively secure the receptacle 46 to the roadway 42 within the recess 48. In typical embodiments the surface features 50 and 52 may be hook and loop fasteners or bubbles and dimples or some similar configurations that manually interlock. Corresponding plugs 54 may be attached to foot members 23 of the pad 21 (or other aligning features of the pad 21) and mated with patterns of receptacles 46 that have been installed in a support surface 42. Such plugs 54 are examples of registration elements that are operatively secured to the pad 12 and that provide a frame of reference for aligning the pad 12 for use in the weighing system 10. The receptacles 46 are examples of registering elements that are operatively secured to a support surface (i.e., the roadway 42) and that may be mated with corresponding registration elements (i.e., the plugs 54) to align registration elements (i.e., the plugs 54) of the weighing system 10 when the weighing system 10 is installed.

The weighing system 10 described herein may be deployed temporarily in different locations without time-consuming, manual alignment. In some embodiments, multiple installations of plates 40 with recesses 38 may be deployed in different locations, and the weighing system 10 may be moved among those locations as needs arise. In some embodiments multiple installations of patterns of receptacles 46 may be deployed in different locations, and the weighing system 10 with plugs 54 may be moved among those locations as needs arise. The registration elements (the recesses 38 in the plate 40 of FIG. 3 and the receptacles 46 of FIG. 4) provide the advantage of facilitating rapid and accurate alignment of the weighing system, without time-consuming, manual alignment, when it is moved to a different location for deployment.

In embodiments where registration elements are deployed in multiple locations and a weighing system is moved among the locations as needs arise, it is often beneficial that the registration elements not interfere with vehicle traffic at locations where the weighing system is not deployed. This can be accommodated, for example, by recessing the plate 40 in the support surface 42 so that the top surface of the plate 40 is substantially level with the surface of the support surface 42, and by inserting separate filler plugs into the receptacles 46.

In summary, embodiments disclosed herein provide systems for deployment of a weighing system among different locations by incorporating registration elements that facilitate the rapid and accurate installation of the weighing system at different locations.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A weighing system comprising:
   a pad having a transducer for weighing a load disposed upon the pad,
   a plurality of registration elements each comprising a foot member operatively secured to the pad; and
   a plurality of registering elements comprising recesses in a plate that is configured to be operatively secured to a roadway, for mating with the plurality of registration elements to align the pad.

2. A weighing system comprising:
   a pad having a transducer for weighing a load disposed upon the pad,
   a plurality of registration elements comprising plugs operatively secured to the pad; and
   a plurality of registering elements comprising receptacles that are configured to be operatively secured to a roadway, for mating with the plurality of registration elements to align the pad.

3. A weighing system comprising:
   a pad having a transducer for weighing a load disposed upon the pad, a plurality of registration elements operatively secured to the pad;

a spacer disposed adjacent the pad;

a plurality of registering elements configured to be operatively secured to a support surface, for mating with the plurality of registration elements to align the pad; and a spacer anchor configured for operatively securing the spacer to the support surface, wherein the pad is further operatively secured to the support surface by the spacer anchor.

* * * * *